United States Patent
Campbell et al.

(10) Patent No.: US 11,779,916 B2
(45) Date of Patent: Oct. 10, 2023

(54) MOISTURE AND VOLATILE ORGANIC COMPOUND CONTENT MEASURING

(71) Applicant: International Business Machines Corporation, Armonk, NY (US)

(72) Inventors: Eric J. Campbell, Rochester, MN (US); Sarah K. Czaplewski-Campbell, Rochester, MN (US); Brandon M. Kobilka, Fishkill, NY (US); Scott B. King, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 58 days.

(21) Appl. No.: 17/474,565

(22) Filed: Sep. 14, 2021

(65) Prior Publication Data
US 2021/0402387 A1    Dec. 30, 2021

Related U.S. Application Data

(62) Division of application No. 16/206,233, filed on Nov. 30, 2018, now abandoned.

(51) Int. Cl.
*B01L 3/04* (2006.01)
*B01L 1/02* (2006.01)
(Continued)

(52) U.S. Cl.
CPC .............. *B01L 3/04* (2013.01); *B01L 1/02* (2013.01); *B01L 3/565* (2013.01); *B01L 3/567* (2013.01); *B01L 7/00* (2013.01); *G01N 1/44* (2013.01); *G01N 5/025* (2013.01); *B01L 2300/049* (2013.01); *B01L 2300/069* (2013.01);
(Continued)

(58) Field of Classification Search
None
See application file for complete search history.

(56) References Cited

U.S. PATENT DOCUMENTS 5,321,719 A    6/1994   Reed
8,123,834 B2 *  2/2012   Masel ............... B01J 20/3265
                                                 95/82
(Continued)

FOREIGN PATENT DOCUMENTS

JP    4756767 B2    8/2011
TW    201245720 A   11/2012

OTHER PUBLICATIONS

Kahn, et al., "Adsorption and removal of phthalic acid and diethyl phthalate from water with zeolitic imidazolate and metal-organic frameworks", Journal of Hazardous Materials, vol. 282, Jan. 23, 2015, pp. 194-200, <https://www.sciencedirect.com/science/article/pii/S0304389414002337?via%3Dihub>.

(Continued)

*Primary Examiner* — Xiaoyun R Xu
(74) *Attorney, Agent, or Firm* — Grant M. McNeilly

(57) ABSTRACT

A thermo-gravimetric analysis system includes a chamber having an interior; and a sample crucible connected to and inside of the chamber, the sample crucible configured to hold a sample material. The system further includes a reference crucible connected to and inside of the chamber; and a metal organic framework (MOF) crucible connected to and inside of the chamber, separate from the sample crucible, the MOF crucible including an MOF material.

19 Claims, 4 Drawing Sheets

(51) Int. Cl.
  *B01L 3/00* (2006.01)
  *B01L 7/00* (2006.01)
  *G01N 5/02* (2006.01)
  *G01N 1/44* (2006.01)

(52) U.S. Cl.
  CPC ....... *B01L 2300/12* (2013.01); *B01L 2300/18* (2013.01); *B01L 2300/1894* (2013.01); *B01L 2400/0463* (2013.01); *B01L 2400/06* (2013.01)

(56) References Cited

U.S. PATENT DOCUMENTS

| | | |
|---|---|---|
| 9,593,132 B2 | 3/2017 | Schroder |
| 2013/0060484 A1 | 3/2013 | Lee |
| 2020/0171482 A1 | 6/2020 | Campbell |

OTHER PUBLICATIONS

Kim, et al., "Adsorption-based atmospheric water harvesting device for arid climates", Nature Communications 9, Article No. 1191, Published Mar. 22, 2018, pp. 1-8, <https://www.nature.com/articles/s41467-018-03162-7>.

Kim, et al., "Water harvesting from air with metal-organic frameworks powered by natural sunlight", Science 10.1126/science.aam8743 (2017), First release: Apr. 13, 2017, pp. 1-10, <https://globalscience.berkeley.edu/sites/default/files/waterharvesting.pdf>.

List of IBM Patents or Patent Applications Treated as Related, Sep. 14, 2021, 2 pages.

Wagner, Matthias, "Determination of Water Content and Dynamic Vapor Sorption Using Gravimetric Methods, Karl Fischer Titration and Thermal Analysis", American Laboratory, Posted: Jun. 20, 2016, 7 pages, <https://www.americanlaboratory.com/914-Application-Notes/187191-Determination-of-Water-Content-and-Dynamic-Vapor-Sorption-Using-Gravimetric-Methods-Karl-Fischer-Titration-and-Thermal-Analysis/>.

Wang, et al., "Simultaneous Detection and Removal of Formaldehyde at Room Temperature: Janus Au@ZnO@ZIF-8 Nanoparticles", Nano-Micro Letters, Jan. 2018, 10:4, 11 pages, <https://link.springer.com/article/10.1007/s40820-017-0158-0>.

Yamagiwa, et al., "Detection of Volatile Organic Compounds by Weight-Detectable Sensors coated with Metal-Organic Frameworks", Scientific Reports vol. 4, Article No. 6247, Published Sep. 1, 2014, 6 pages, <https://www.nature.com/articles/srep06247>.

* cited by examiner mber having an interior; and a sample crucible connected to and inside of the chamber, the sample crucible configured to hold a sample material. The system further includes a reference crucible connected to and inside of the chamber; and a metal organic framework (MOF) crucible connected to and inside of the chamber, separate from the sample crucible, the MOF crucible including an MOF material.

MOISTURE AND VOLATILE ORGANIC COMPOUND CONTENT MEASURING

BACKGROUND

Aspects of polymer properties and composition are water and volatile organic compound (VOCs) content. Two traditional methods for analyzing polymer properties and composition are thermo-gravimetric analysis (TGA) and/or Karl-Fischer Titration (KF). Using traditional TGA, a mass of a sample is measured over time as its temperature is increased. However, multiple different chemicals (e.g., water and VOCs) may outgas from the sample at a given temperature. Because traditional TGA cannot distinguish what chemicals have left the sample, there is uncertainty as to how much of the change in mass of the sample is due to which chemicals, for example, water versus VOCs. Thereby, the chemical discrimination of a TGA system is limited.

Therefore, the accepted method to measure water content in polymer materials is KF because KF employs specific chemicals to detect water. Unfortunately, these chemicals are mutagenic and are incompatible with some of the VOCs that are beneficial to study to determine polymer properties and composition. Thereby, the chemical scope of analysis of a KF system is limited.

SUMMARY

According to some embodiments of the present disclosure, a thermo-gravimetric analysis system includes a chamber having an interior; and a sample crucible connected to and inside of the chamber, the sample crucible configured to hold a sample material. The system further includes a reference crucible connected to and inside of the chamber; and a metal organic framework (MOF) crucible connected to and inside of the chamber, separate from the sample crucible, the MOF crucible including an MOF material.

According to some embodiments of the present disclosure, a system includes a first chamber; and an MOF crucible connected to and inside of the first chamber, the MOF crucible including an MOF material. The system further includes an inlet duct connected to the first chamber; an inlet valve positioned in the inlet duct; a pump configured to draw fluid into the first chamber through the duct; an outlet duct connected to the first chamber; and an outlet valve positioned in the outlet duct.

According to some embodiments of the present disclosure, a method includes loading a first chamber with a sample material that includes a target chemical; sealing the first chamber; heating the first chamber; exposing an MOF material, that is configured to sorb the target chemical, to fluid from the first chamber; and measuring a mass of the MOF material.

DETAILED DESCRIPTION

Figure 1:
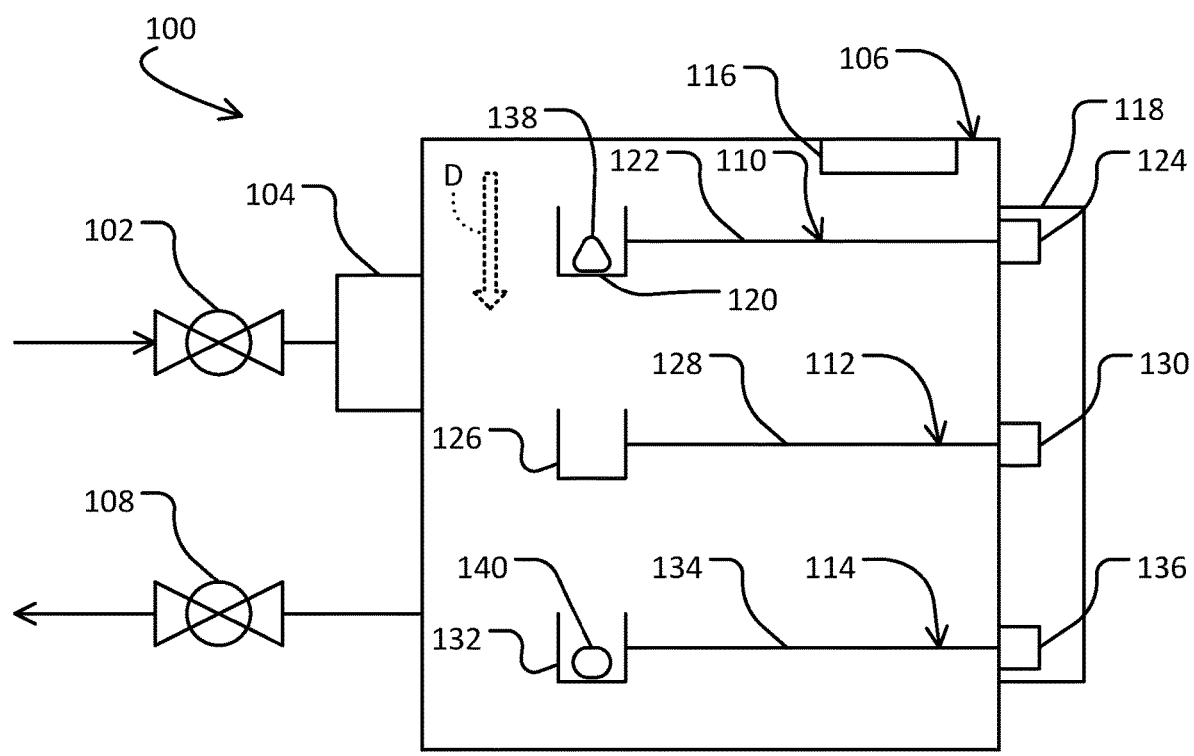
FIG. 1 shows a schematic view of a thermo-gravimetric analysis (TGA) apparatus with a metal organic framework (MOF) material.

FIG. 1 shows a schematic view of thermo-gravimetric analysis (TGA) apparatus 100. TGA apparatus 100 comprises inlet valve 102, heater 104, chamber 106, and outlet valve 108. In the illustrated embodiment, these components are fluidly connected to each other in series in that order.

In some embodiments, chamber 106 comprises sample assembly 110, reference assembly 112, metal-organic framework (MOF) assembly 114, fan 116, and controller 118. Sample assembly 110 comprises sample crucible 120 connected to sample beam 122 which is connected to sample balance 124. Reference assembly 112 comprises reference crucible 126 connected to reference beam 128 which is connected to reference balance 130. MOF assembly 114 comprises MOF crucible 132 connected to MOF beam 134 which is connected to MOF balance 136. Sample balance 124, reference balance 130, and MOF balance 136 are all communicatively connected to controller 118.

In the illustrated embodiment, the design (e.g., the dimensions and proportions) and materials (e.g., a ceramic crucible and a metallic beam) of sample assembly 110, reference assembly 112, MOF assembly 114 are the same, which makes comparison between them by controller 118 simpler. Controller 118 can be implemented as a computer processor with measurement and communication capabilities, for example, with heater 104, sample balance 124, reference balance 130, MOF balance 136, and a display (not shown).

In the illustrated embodiment, sample crucible 120 is holding test sample 138, and MOF crucible 132 is holding MOF sorber 140. Test sample 138 is an amount of material (for example, in a solid or pulverulent form) that is being studied in TGA apparatus 100. MOF sorber 140 is a metal-organic framework material (for example, in a solid or pulverulent form) that is used to study a target chemical that will be outgassed from test sample 138. In an example, test sample 138 is 20 mg of finely chopped polyamide polymer material containing approximately 10% water, and MOF sorber 140 includes 20 mg of $Zr_6O_4(OH)_4(fumarate)_6$, which is a material configured to sorb water. In another example, MOF sorber 140 is comprised of $[CU_3(1,3,5-benzenetricarboxylate)_2(H_2O)_3] \cdot xH_2O$, which is a material configured to sorb toluene, ethanol, acetone, n-octane, n-hexane, n-hexanol, n-heptane, n-heptanol, n-octane, n-octanol, o-xylene, m-xylene, and/or p-xylene. In another example, MOF sorber 140 is comprised of $Zn_4O(1,4-benzenedicarboxylate)_3$, which is a material configured to sorb toluene, ethanol, acetone, and/or n-octane. In another example, MOF sorber 140 is comprised of zinc-methylimidazolate framework-8, which is a material configured to sorb formaldehyde, phthalic acid, and/or phthalate esters.

Figure 2:
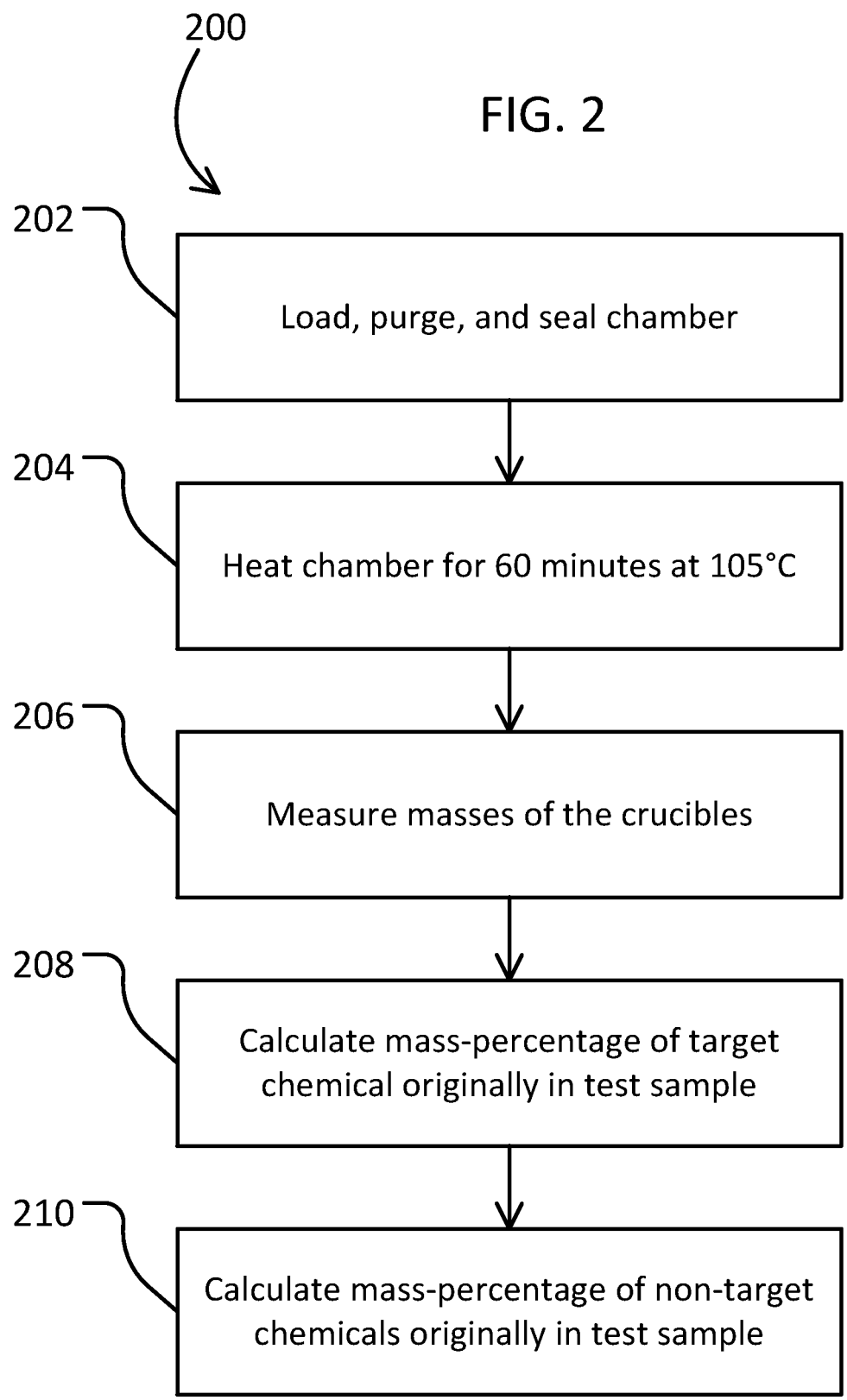
FIG. 2 shows a flowchart of a method of operating the TGA apparatus of FIG. 1.

FIG. 2 shows a flowchart of method 200 of operating TGA apparatus 100. Method 200 will be discussed with reference to the features shown in FIG. 1. In the illustrated embodiment, at box 202, test sample 138 and MOF sorber 140 are loaded into sample crucible 120 and MOF crucible 132, respectively. Then chamber 106 is purged with an inert gas, such as nitrogen or argon, and sealed.

At box 204, heater 104 heats the interior of chamber 106 with the assistance of fan 116, thus convectively heating test sample 138 slightly above the temperature of vaporization of the target chemical. In an example, the internal temperature of chamber 106 is heated to 105° C. and this temperature is maintained for one hour. During this time, water and some other materials (such as some VOCs and some plasticizers) present in test sample 138 can vaporize, and the water can be sorbed by MOF sorber 140. In alternate embodiments, MOF sorber 140 is configured to sorb one or more other materials (such as VOCs or plasticizers), which would occur at box 204 instead of water. At box 206, controller 118 uses balances 124, 130, 136 to determine the deflections of beams 122, 128, and 134 in direction D, respectively. These deflections can be used by controller 118 to determine the current masses of test sample 138 and MOF sorber 140. Because the mass of reference assembly 112 does not change, controller 118 can refer to the deflection of reference beam 128 as a baseline for which to compare the deflections of sample beam 122 and MOF beam 134.

At box 208, the mass-percentage of target chemical (e.g., water, in this example or one or more VOCs or plasticizers in other examples) originally in test sample 138 is calculated. This can be calculated using the difference between the known masses of test sample 138 and MOF sorber 140 at box 202 (before the heating) and the measured mass of MOF sorber 140 at box 206 (after heating). In addition, MOF sorber 140 may not have 100% efficiency with respect to sorbing the target chemical, for example, in a given chamber 106 under given set of conditions with a given target chemical, MOF sorber 140 may only sorb a fraction of the target chemical vaporized from test sample 138 before becoming saturated. Therefore, a correction factor (e.g., the inverse of the efficiency at saturation) may be applied to the calculation of the amount of target chemical that was in test sample 138 as such:

$$\text{TCM\%} = (\Delta M\text{sorber} * C_1 * 100\%)/M\text{sample} \qquad \text{Equation A:}$$

wherein:
TCM %=target chemical mass percentage
ΔMsorber=change in mass of MOF sorber 140 at box 206
$C_1$=efficiency correction factor=1/efficiency
Msample=mass of test sample 138 at box 202

In one example, if the mass of test sample 138 was 20 mg, the mass change of MOF sorber 140 is 0.8 mg, and MOF sorber 140 has an efficiency of 40%, then the target chemical mass-percentage of test sample 138 would be 10% (calculation: (0.8 mg*(1/0.4)*100%)/20 mg).

At box 210, the mass-percentage of the non-target chemicals (e.g., one or more VOCs in this example, or water, other VOCs, or plasticizers in other examples) that have outgassed from test sample 138 can be calculated. This calculation can be performed as follows:

$$\text{NCM\%} = ((\Delta M\text{sample} - \Delta M\text{sorber} * C_1) * 100\%)/M\text{sample} \qquad \text{Equation B:}$$

wherein:
NCM %=non-target chemical mass-percentage
ΔMsample=change in mass of test sample 138 at box 206
ΔMsorber=change in mass of MOF sorber 140 at box 206
$C_1$=efficiency correction factor=1/efficiency
Msample=mass of test sample 138 at box 202

In one example, the mass of test sample 138 is 20 mg, the mass change of test sample 138 is 5 mg, the mass change of MOF sorber 140 is 0.8 mg, and MOF sorber 140 has an efficiency of 40%. Then the non-target chemical mass-percentage of test sample 138 would be 15% (calculation: ((5 mg−0.8 mg*(1/0.4))*100%)/20 mg). When combined with the result from the previous example, the mass-percentage of test sample 138 that is the nominal material of test sample 138 (e.g., polyamide) would be 75%.

The components, configuration, and steps of TGA apparatus 100 and method 200 allow for the measurement of a particular target chemical (or type of chemical) amongst other chemicals outgassed by test sample 138. The ability to discretely measure the target chemical(s) using TGA apparatus 100 renders moot the need for the equipment and hazardous chemicals employed in a KF system that would otherwise traditionally be used to discriminate the outgassed chemicals from each other.

TGA apparatus 100 and method 200 as shown in FIGS. 1 and 2, respectively, are embodiments of the present disclosure to which there are alternative embodiments. For example, chamber 106 can comprise two MOF assemblies 114A and 114B. In such an embodiment, MOF assembly 114A would include MOF sorber 140A that would be configured to sorb one target chemical, such as water, and MOF assembly 114B would include MOF sorber 140B that would be configured to sorb another target chemical, such as one or more VOCs or plasticizers.

For another alternative example, alternative equations can be used at boxes 208 and 210 instead of Equation A and Equation B, respectively. The calculations in Equations A and B assume effectively-complete vaporization of the target chemical from test sample 138 and effectively-complete saturation of MOF sorber 140 by the target chemical. This state requires a certain amount of time to elapse while these processes are taking place. In alternative embodiments, a time-saving measure may be implemented that allows an estimation of the mass-percentages of target and non-target chemicals without having to wait for the processes inside chamber 106 to become effectively-complete. In such embodiments, additional correction factors can be implemented in Equations A' and B'. These correction factors can be based on the completeness of the vaporization and sorption processes at a given time, wherein the given time is a fraction of time that it takes for the effective completion of said processes. These correction factors may be determined theoretically and/or empirically, and can be implemented as follows:

$$\text{TCM\%} = (\Delta M\text{sorber} * C_1 * C_2 * 100\%)/M\text{sample} \qquad \text{Equation A':}$$

wherein:
TCM %=target chemical mass percentage
ΔMsorber=change in mass of MOF sorber 140 at box 206
$C_1$=efficiency correction factor=1/efficiency
$C_2$=fractional-time MOF sorber 140 correction factor=1/completeness of sorption
Msample=mass of test sample 138 at box 202

$$\text{NCM\%} = (((\Delta M\text{sample} * C_3) - \Delta M\text{sorber} * C_1 * C_2) * 100\%)/M\text{sample} \qquad \text{Equation B':}$$

wherein:
NCM %=non-target chemical mass-percentage
ΔMsample=change in mass of test sample 138 at box 206
ΔMsorber=change in mass of MOF sorber 140 at box 206
$C_1$=efficiency correction factor=1/efficiency
$C_2$=fractional-time MOF sorber 140 correction factor=1/completeness of sorption
$C_3$=fractional-time test sample 138 correction factor=1/completeness of vaporization
Msample=mass of test sample 138 at box 202

In one example, the mass of test sample 138 is 20 mg, the mass change of test sample 138 is 2.5 mg, the mass change of MOF sorber 140 is 0.2 mg, MOF sorber 140 has an efficiency of 40%, 15 min. has elapsed of the 60 min. it takes for effectively-complete vaporization and sorption wherein the vaporization process is 50% complete and the sorption process is 25% complete. Then the target chemical mass-percentage of test sample 138 would be estimated to be 10% (calculation: (0.2 mg*(1/0.4)*(1/0.25)*100%)/20 mg). In addition, the non-target chemical mass-percentage of test sample 138 would be estimated to be 15% (calculation: ((2.5 mg*(1/0.5)−0.2 mg*(1/0.4)*(1/0.25))*100%)/20 mg), which leads to the mass-percentage of test sample 138 that is the nominal material of test sample 138 (e.g., polyamide) being an estimated 75%.

Figure 3:
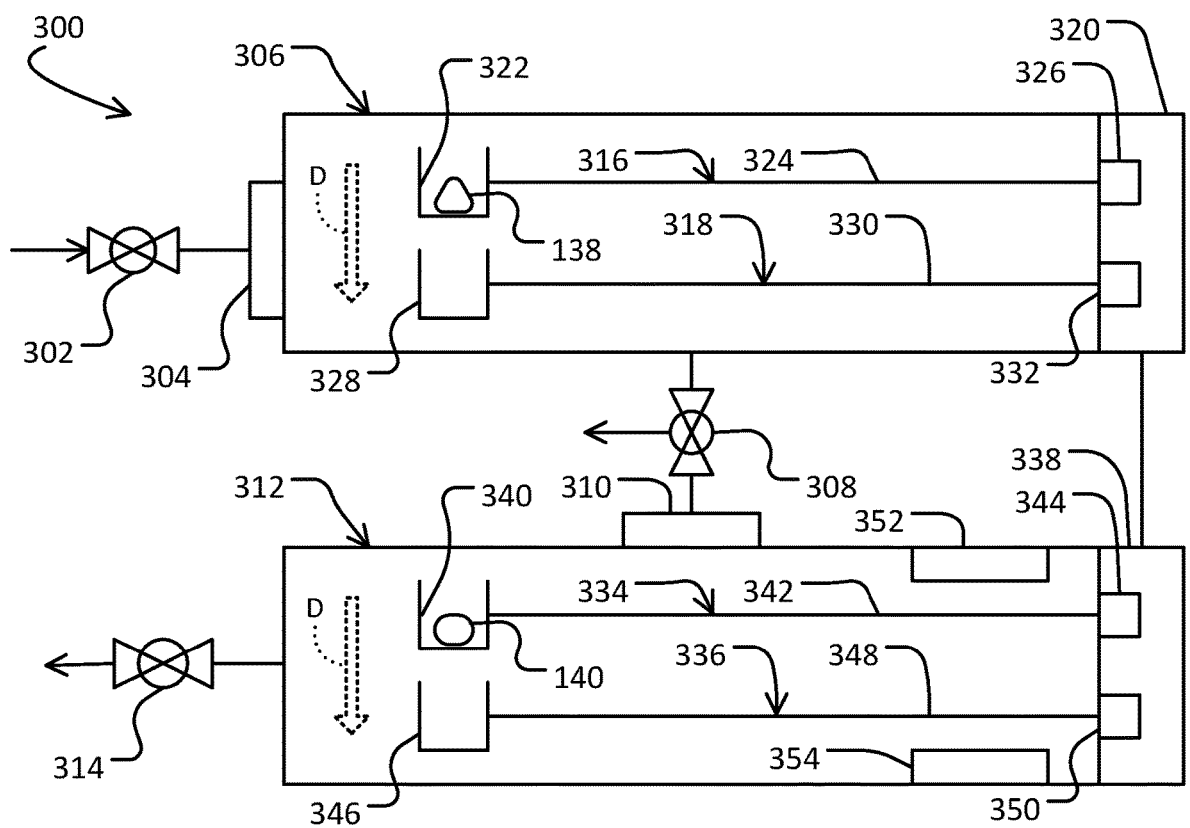
FIG. 3 shows a schematic view of an alternate embodiment TGA apparatus with an MOF material.
Figure 4:
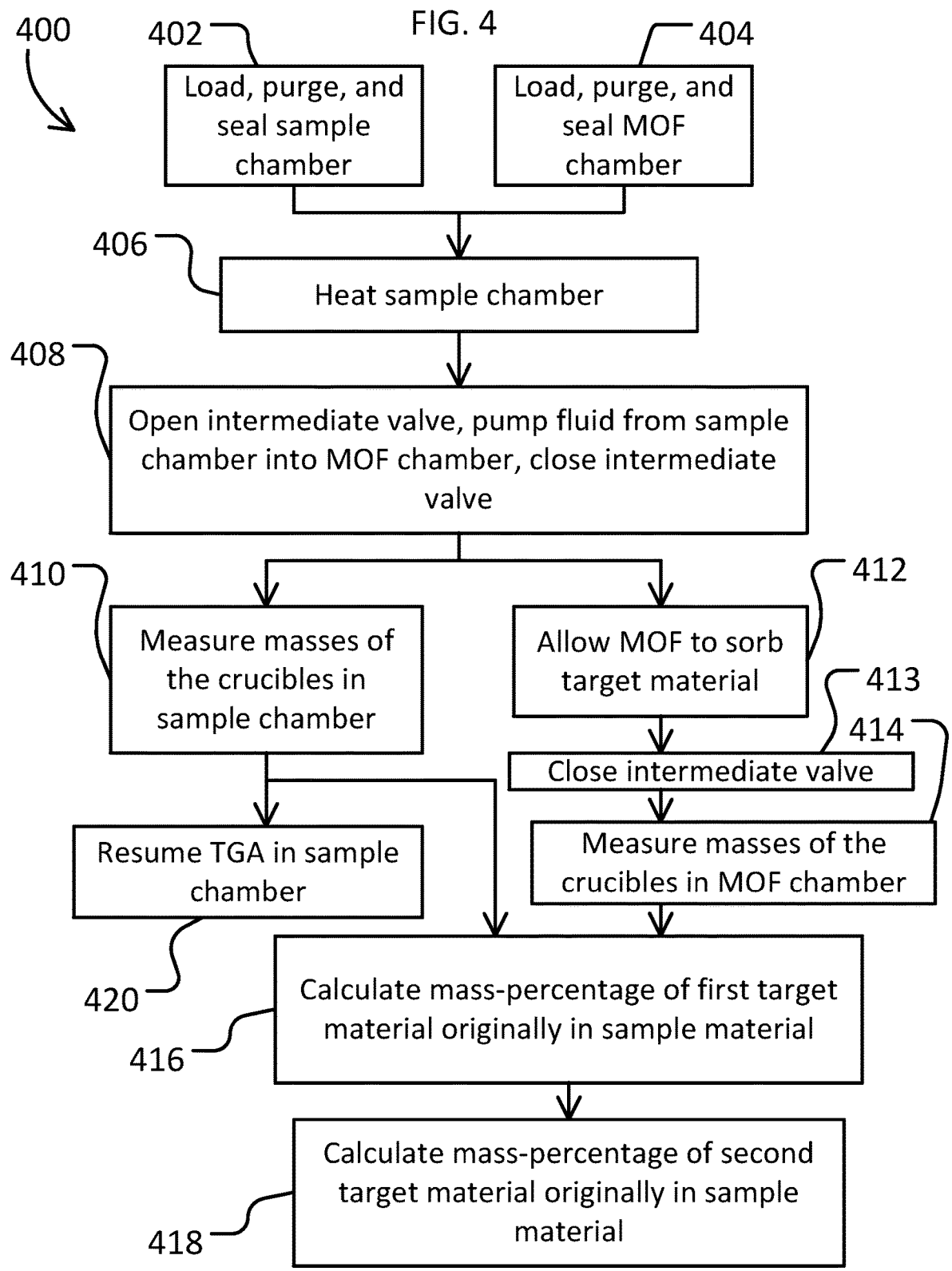
FIG. 4 shows a flowchart of a method of operating the alternate embodiment TGA apparatus of FIG. 3.

Further alternative embodiments to TGA apparatus 100 and method 200 include TGA apparatus 300 and method 400, shown in FIGS. 3 and 4 respectively. Specifically, FIG. 3 shows a schematic view of alternate embodiment TGA apparatus 300. TGA apparatus 300 comprises inlet valve 302, heater 304, sample chamber 306, intermediate valve 308, pump 310, MOF chamber 312, and outlet valve 314. In the illustrated embodiment, these components are fluidly connected to each other in series in that order.

In some embodiments, sample chamber 306 comprises sample assembly 316, first reference assembly 318, and sample controller 320. Sample assembly 316 comprises sample crucible 322 connected to sample beam 324 which is connected to sample balance 326. First reference assembly 318 comprises first reference crucible 328 connected to first reference beam 330 which is connected to first reference balance 332. Sample balance 326 and first reference balance 332 are communicatively connected to sample controller 320.

In some embodiments, MOF chamber 312 comprises MOF assembly 334, second reference assembly 336, and MOF controller 338. MOF assembly 334 comprises MOF crucible 340 connected to MOF beam 342 which is connected to MOF balance 344. Second reference assembly 336 comprises second reference crucible 346 connected to second reference beam 348 which is connected to second reference balance 350. MOF balance 344 and second reference balance 350 are communicatively connected to MOF controller 338, and sample controller 320 and MOF controller 338 are communicatively connected to one another. Although, in other embodiments, there is only one controller connected to all of the balances. MOF chamber 312 further includes fan 352 and cold plate 354 (which can extract heat from MOF chamber 312). Thereby, the vapors inside MOF chamber 312 can be cooled and/or circulated.

In the illustrated embodiment, sample crucible 322 is holding test sample 138, and MOF crucible 340 is holding MOF sorber 140. The attributes and properties of test sample 138 and MOF sorber 140 have been discussed previously with respect to FIGS. 1 and 2 above.

Positioned between sample chamber 306 and MOF chamber 312 are intermediate valve 308 and pump 310. Intermediate valve 308 and pump 310 control flow from sample chamber 306 into MOF chamber 312 by allowing flow and creating a pressure differential therebetween, respectively, to urge flow between sample chamber 306 and MOF chamber 312. Thereby, a target chemical or chemicals can be outgassed from test sample 138 into the ambient fluid in sample chamber 306 and then transported into MOF chamber 312 by moving the fluid into MOF chamber 312. Intermediate valve 308 can then be closed and pump 310 can be shut off, which allows the target chemical(s) to be studied using MOF sorber 140 independently from what is occurring in sample chamber 306.

FIG. 4 shows a flowchart of method 400 of operating TGA apparatus 300. Method 400 will be discussed with reference to the features shown in FIG. 3. In the illustrated embodiment, at box 402, test sample 138 is loaded into sample crucible 322, and sample chamber 306 is purged with an inert gas, such as nitrogen or argon, and sealed. At box 404, MOF sorber 140 is loaded into MOF crucible 340, and MOF chamber 312 is purged with an inert gas, such as nitrogen or argon, and sealed.

At box 406, heater 304 heats the interior of sample chamber 306 which heats test sample 138 to at least the temperature of vaporization of the target chemical(s). In some embodiments, the internal temperature of sample chamber 306 is heated to slightly above the temperature of vaporization of the target chemical(s) (for example, no more than 5° C. higher or no more than 1% higher using the Kelvin scale), and in other embodiments, the internal temperature of sample chamber 306 is heated to more than slightly above the temperature of vaporization of the target chemical(s) (for example, more than 5° C. higher or more than 1% higher using the Kelvin scale). In one example, the internal temperature of sample chamber 306 is heated to 105° C. and this temperature is maintained for one hour. During this time, water, some VOCs, and some plasticizers present in test sample 138 can vaporize. At box 408, intermediate valve 308 is opened, pump 310 pumps fluid from sample chamber 306, including the target chemical(s), into MOF chamber 312, and intermediate valve 308 is closed. At box 410, sample controller 320 uses balances 326 and 332 to determine the deflections of beams 324 and 330 in direction D, respectively. These deflections can be used by sample controller 320 to determine the current mass of test sample 138. Because the mass of first reference assembly 318 does not change, sample controller 320 can refer to the deflection of first reference beam 318 as a baseline for which to compare the deflection of sample beam 324.

At box 412, the target chemical (e.g. water in this example embodiment) can be sorbed by MOF sorber 140, over the course of a predetermined amount of time, such as, for example, an hour. During this time, fan 352 and/or cold plate 354 can be employed to control the environment inside MOF chamber 312. In alternate embodiments, MOF sorber 140 is configured to sorb one or more VOCs or plasticizers, which would occur at box 412 instead of water. At box 413, intermediate valve 308 is closed, fluidly disconnecting MOF chamber 312 from sample chamber 306.

At box 414, MOF controller 338 uses balances 344 and 350 to determine the deflections of beams 342 and 348 in direction D, respectively. These deflections can be used by MOF controller 338 to determine the current mass of MOF sorber 140. Because the mass of second reference assembly 336 does not change, MOF controller 338 can refer to the deflection of second reference beam 348 as a baseline for which to compare the deflection of MOF beam 342. At box 416, the mass-percentage of target chemical (e.g., water, in this example or one or more VOCs or plasticizers in other examples) originally in test sample 138 is calculated. This can be done, for example, using Equation A or Equation A' and the related analytical techniques that were discussed previously. At box 418, the mass-percentage of the non-target chemicals (e.g., one or more VOCs in this example, or water, other VOCs, or plasticizers in other examples) that have outgassed from test sample 138 can be calculated. This can be done, for example, using Equation B or Equation B' and the related analytical techniques that were discussed previously. Meanwhile, at box 420, sample chamber 306 can resume further TGA testing of test sample 138. This can include further heating and measuring of test sample 138.

The components, configuration, and steps of TGA apparatus 300 and method 400 allow for the measurement of a particular target chemical (or type of chemical) amongst other chemicals outgassed by test sample 138. The ability to discretely measure the target chemical(s) using TGA apparatus 100 renders moot the need for the equipment and hazardous chemicals employed in a KF system that would otherwise traditionally be used to discriminate the outgassed chemicals from each other. Furthermore, TGA apparatus 300 and method 400 allows for MOF sorber 140 to be selectively shielded from the environment inside of sample chamber 306. This prevents thermal damage or degradation of MOF sorber 140 due to the high temperatures that can occur at the later stages of TGA testing of test sample 138. By the same token, it allows the later stages of TGA testing of test sample 138 to resume as soon as the fluid transfer between sample chamber 306 and MOF chamber 312 is sufficiently complete and the fluid connection therebetween is severed, thus saving time. Because MOF chamber 312 can operate independently from sample chamber 306, MOF chamber 312 (and its related components) can be added to a traditional single-chamber TGA apparatus (not shown) to allow the use of MOF sorber 140 without the need for purchasing an entire new TGA apparatus, thus saving money.

TGA apparatus 300 and method 400 as shown in FIGS. 3 and 4, respectively, are embodiments of the present disclosure to which there are alternative embodiments. For example, fan 352 can be present in both or neither of chambers 306 and 312. For another example, a single controller can be employed for both of chambers 306 and 312. For another example, intermediate valve 308 can be opened prior to boxes 402 and 404 and remain open until box 413. For another example, intermediate valve 308 can be closed before box 412. In such an embodiment, intermediate valve 308 may be closed once pump 310 has dropped the pressure in sample chamber 306 down to 13.3 Pa (100 mTorr).

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
a first chamber;
a metal organic framework (MOF) crucible connected to and inside of the first chamber, the MOF crucible including an MOF material;
a first reference crucible connected to and inside of the first chamber;
an inlet duct connected to the first chamber;
an inlet valve positioned in the inlet duct;
a pump configured to draw fluid into the first chamber through the duct;
an outlet duct connected to the first chamber;
an outlet valve positioned in the outlet duct;
a second chamber connected to the inlet duct;
a sample crucible connected to and inside of the second chamber, the sample crucible configured to hold a sample material; and
a second reference crucible connected to and inside of the second chamber.

2. The system of claim 1, wherein the MOF material is configured to sorb a water material.

3. The system of claim 1, wherein the MOF material is configured to sorb a volatile organic compound.

4. The system of claim 1, wherein the MOF material is configured to sorb a plasticizer material.

5. The system of claim 1, wherein the sample crucible, the first reference crucible, the second reference crucible, and the MOF crucible are of the same design and materials.

6. The system of claim 1, further comprising:
a processor configured to calculate a first change in mass of the MOF material and a second change in mass of the sample material.

7. The system of claim 1, further comprising:
a cooler for cooling the first chamber; and
a heater for heating the second chamber.

8. A system comprising:
a first chamber;
a metal organic framework (MOF) crucible connected to and inside of the first chamber, the MOF crucible including an MOF material;
an inlet duct connected to the first chamber;
a second chamber connected to the inlet duct;
a sample crucible connected to and inside of the second chamber, the sample crucible configured to hold a sample material; and
a reference crucible connected to and inside of the second chamber.

9. The system of claim 8, wherein the MOF material is configured to sorb a water material.

10. The system of claim 8, wherein the MOF material is configured to sorb a volatile organic compound.

11. The system of claim 8, wherein the MOF material is configured to sorb a plasticizer material.

12. The system of claim 8, wherein the sample crucible, the reference crucible, and the MOF crucible are of the same design and materials.

13. The system of claim 8, further comprising:
an inlet valve positioned in the inlet duct;
a pump configured to draw fluid into the first chamber through the duct; and
an outlet duct connected to the first chamber.

14. The system of claim 8, further comprising:
a processor configured to calculate a first change in mass of the MOF material and a second change in mass of the sample material.

15. The system of claim 8, further comprising:
a cooler for cooling the first chamber; and
a heater for heating the second chamber.

16. A method comprising:
loading a first chamber with a sample material that comprises a target chemical;
sealing the first chamber;
loading a second chamber with a metal organic framework (MOF) material that is configured to sorb the target chemical;
sealing the second chamber;
heating the first chamber;
exposing the MOF material to fluid from the first chamber; and
measuring a mass of the MOF material.

17. The method of claim 16, wherein the target chemical is selected from the group consisting of: a water material, a volatile organic compound, and a plasticizer material.

18. The method of claim 16, wherein exposing the MOF material to fluid from the first chamber comprises creating a pressure differential between the first chamber and the second chamber to urge fluid from the first chamber to move into the second chamber.

19. The method of claim 18, wherein measuring the mass of the MOF material comprises resealing the second chamber.

* * * * *